US006566003B2

(12) United States Patent
Acker (10) Patent No.: US 6,566,003 B2
(45) Date of Patent: May 20, 2003

(54) METHOD AND APPARATUS FOR $CO_2$ - DRIVEN AIR MANAGEMENT FOR A FUEL CELL SYSTEM

(75) Inventor: William P. Acker, Rexford, NY (US)

(73) Assignee: MTI MicroFuel Cells, Inc., Albany, NY (US)

( * ) Notice: Subject to any disclaimer, the term of this patent is extended or adjusted under 35 U.S.C. 154(b) by 232 days.

(21) Appl. No.: 09/837,831

(22) Filed: Apr. 18, 2001

(65) Prior Publication Data

US 2002/0155336 A1 Oct. 24, 2002

(51) Int. Cl.$^7$ ............ H01M 2/00; H01M 2/02; H01M 2/08; H01M 2/14
(52) U.S. Cl. ............ 429/34; 429/35; 429/38; 429/39
(58) Field of Search ............ 429/34, 35, 38, 429/39

(56) References Cited

U.S. PATENT DOCUMENTS

| | | | |
|---|---|---|---|
| 4,046,956 A | | 9/1977 | Fanciullo |
| 4,622,275 A | * | 11/1986 | Noguchi et al. ............ 429/19 |
| 4,673,624 A | | 6/1987 | Hockaday |
| 4,810,597 A | | 3/1989 | Kumagai et al. |
| 5,232,793 A | * | 8/1993 | Miyauchi et al. ............ 429/16 |
| 5,409,784 A | * | 4/1995 | Bromberg et al. ............ 429/13 |
| 5,449,568 A | * | 9/1995 | Micheli et al. ............ 429/20 |
| 5,523,177 A | | 6/1996 | Kosek et al. |
| 5,541,014 A | * | 7/1996 | Micheli et al. ............ 429/19 |
| 5,573,866 A | | 11/1996 | Van Dine et al. |
| 5,599,638 A | | 2/1997 | Surampudi et al. |
| 5,631,099 A | | 5/1997 | Hockaday |

(List continued on next page.)

OTHER PUBLICATIONS

"Fuel Cell", 1992 Fuel Cell Seminar, Program and Abstracts, pp. 233–236, 461–464.
"Miniaturized Fuel Cells for Portable Power", Helen L. Maynard and Jeremy P. Meyers, Lucent Technologies, 2000.
"Pocket–size PEMs", Paul Sharke, Mechanical Engineering.
"Polymer Electrolyte Fuel Cells as Potential Power Sources for Portable Electronic Devices", Shinshon Gottesfeld and Mahlon S. Wilson, pp. 487–517.
"Fuel Cell Systems Explained"; James Laramine and Andrew Dicks, Nov. 2000, Wiley & Sons, Ltd., New York, pp. 94–97.

Primary Examiner—Carol Chaney
Assistant Examiner—Donald V. Scaltrito
(74) Attorney, Agent, or Firm—Cesari and McKenna, LLP (57) ABSTRACT

A method and apparatus for oxygen management in a direct oxidation fuel cell system is provided. The oxygen management apparatus forces oxygen (typically from ambient air) into the cathode chamber of the fuel cell to facilitate the flow of oxygen across the cathode face of the fuel cell. It does so by utilizing the carbon dioxide already produced in the chemical reaction on the anode chamber of the cell. In a first embodiment of the invention, a turbine assembly is placed in fluid communication with the anode chamber of the fuel cell. The turbine assembly is driven when the carbon dioxide produced at the anode chamber flows over the blades of a first turbine (which is referred to herein as "the vent turbine"). The vent turbine is attached to a drive shaft that is used to cause a second turbine (or fan) to draw oxygen (generally from ambient air) into the cathode chamber of the fuel cell. This drawn-in air forces oxygen over the cathode of the fuel cell. The second turbine is referred to herein as "the inlet turbine." Other embodiments of the invention allow for adjustments to be made depending upon the conditions in which the invention is used.

32 Claims, 7 Drawing Sheets

U.S. PATENT DOCUMENTS

| | | |
|---|---|---|
| 5,723,228 A | 3/1998 | Okamoto |
| 5,759,712 A | 6/1998 | Hockaday |
| 5,763,113 A | 6/1998 | Meltser et al. |
| 5,766,786 A | 6/1998 | Fleck et al. |
| 5,773,162 A * | 6/1998 | Surampudi et al. ........... 429/39 |
| 5,795,668 A | 8/1998 | Banerjee |
| 5,874,183 A * | 2/1999 | Uematsu ..................... 429/34 |
| 5,916,699 A | 6/1999 | Thomas et al. |
| 5,945,229 A | 8/1999 | Meltser |
| 5,945,231 A | 8/1999 | Narayanan et al. |
| 5,981,096 A * | 11/1999 | Hornburg et al. ............. 429/17 |
| 5,992,008 A | 11/1999 | Kindler |
| 6,093,502 A | 7/2000 | Carlstron, Jr. et al. |
| 6,172,124 B1 * | 1/2001 | Wolflick et al. ............. 518/705 |
| 6,213,234 B1 * | 4/2001 | Rosen et al. ................ 180/65.3 |
| 6,265,092 B1 | 7/2001 | Meltser et al. |
| 6,322,917 B1 | 11/2001 | Acker |

* cited by examiner

METHOD AND APPARATUS FOR $CO_2$ - DRIVEN AIR MANAGEMENT FOR A FUEL CELL SYSTEM

BACKGROUND OF THE INVENTION

1. Field of the Invention

The present invention relates generally to the field of direct oxidation fuel cells and, more specifically, to delivery of oxygen to the cathode of the fuel cell.

2. Background Information

Fuel cells are devices in which an electrochemical reaction is used to generate electricity. A variety of materials may be suited for use as a fuel depending upon the materials chosen for the components of the cell. Organic materials, such as methanol or natural gas, are attractive choices for fuel due to the their high specific energy.

Fuel systems may be divided into "reformer-based" (i.e., those in which the fuel is processed in some fashion before it is introduced into the cell) or "direct oxidation" in which the fuel is fed directly into the cell without internal processing. Most currently available fuel cells are reformer-based fuel cell systems. However, fuel-processing requirements for such systems limits their use to relatively large applications.

Direct oxidation fuel cell systems may be better suited for a number of applications such as smaller mobile devices (i.e., mobile phones, handheld and laptop computers), as well as in larger applications. Typically, in direct oxidation fuel cells, a carbonaceous liquid fuel in an aqueous solution (typically aqueous methanol) is applied to the anode face of a membrane electrode assembly (MEA) containing a protonically-conductive but, electronically non-conductive membrane (PCM) using a catalyst on the surface of the PCM (or otherwise present in the anode) to enable direct oxidation of the a fuel on the anode. The hydrogen protons are separated from the electrons and the protons pass through the PCM, which is impermeable to the electrons. The electrons thus seek a different path to reunite with the protons and travel through a load, providing electrical power.

One example of a direct oxidation system is the direct methanol fuel cell system or DMFC. In a DMFC, methanol in an aqueous solution is used as fuel, and oxygen, preferably from ambient air, is used as the oxidizing agent. There are two fundamental reactions that occur in a DMFC which allow a DMFC power system to provide electricity to power consuming devices: the anodic disassociation of the methanol and water fuel mixture into $CO_2$, protons, and electrons, and the cathodic combination of protons, electrons and oxygen into water. The overall reaction may be limited by the failure of either of these reactions to completion (i.e. failure to oxidize the fuel mixture will limit the cathodic generation of water, and vice versa).

As noted, the DMFC produces carbon dioxide as a result of the reaction at the anode. This carbon dioxide is usually treated as a waste product, and is separated from the remaining methanol fuel mixture before such fuel is re-circulated.

In an alternative usage, the carbon dioxide gas can be used to passively pump liquid methanol into the fuel cell. This is disclosed in U.S. patent application Ser. No. 09/717,754, filed on Dec. 8, 2000, for a PASSIVELY PUMPED LIQUID FEED FUEL CELL SYSTEM, which is commonly owned by the assignee of the present invention, and which is incorporated by reference herein in its entirety.

Fuel cells have been the subject of intensified recent development because of their high energy density in generating electric power from carbonaceous fuels. This has many benefits in terms of both operating costs and environmental concerns. Adaptation of such cells to mobile uses, however, is not straightforward because of technical difficulties associated with reforming the hydrocarbon fuel in a simple and cost effective manner, and within acceptable form factors and volume limits. Further, a safe and efficient storage means for hydrogen gas presents a challenge because hydrogen gas must be stored at high pressure and at cryogenic temperatures or in heavy absorption matrices in order to achieve useful energy densities. It has been found, however, that a compact means for storing hydrogen is in a hydrogen rich compound with relatively weak chemical bonds, such as methanol (and to a lesser extent, ethanol, propane, butane and other carbonaceous liquids). Thus, efforts to develop the DMFC commercially have increased over the past several years.

However, to ensure that the DMFC will continue generating electricity, sufficient oxygen must be supplied to the cathode, and under certain operating conditions, it may be necessary to provide a means to facilitate the removal of excess water from the fuel cell.

There remains a need, therefore, for fuel cell system that optimizes oxygen being provided to the cathode and avoids excess water accumulation on the cathode of the fuel cell.

It is thus an object of the present invention to provide a method and apparatus for oxygen management in a fuel cell system. It is a further object of the invention to provide oxygen management while utilizing by-products of the electrochemical reactions in the fuel cell to maintain a sufficient flow of oxygen across the cathode in a manner that minimizes the use of electricity from the fuel cell.

It is a further object of the invention to provide an air management system that continues to operate efficiently in various physical orientations, and that is adjustable for variations in operating conditions, such as for example, changes in temperature or relative humidity of the ambient environment.

SUMMARY OF THE INVENTION

The present invention provides a method and apparatus for oxygen management in a direct oxidation fuel cell system. The oxygen management apparatus forces oxygen (typically from ambient air) through the cathode chamber to facilitate the flow of oxygen across the cathode face of the membrane electrode assembly (MEA) of the fuel cell. It does so by utilizing anodically-generated carbon dioxide to cause the flow of ambient air or other oxidizing agent across the cathode face of the MEA.

In a first embodiment of the invention, a turbine assembly is placed in fluid communication with the anode side of the fuel cell. The turbine assembly is driven when the carbon dioxide produced at the anode side flows over the blades of a first turbine (which is referred to herein as "the vent turbine"). The vent turbine is attached to a drive shaft that is used to cause a second turbine (or fan) to draw oxygen (generally from ambient air) into the cathode side of the fuel cell. This drawn-in air flows over the cathode face of the membrane electrolyte assembly of the fuel cell. The second turbine is referred to herein as "the inlet turbine."

In general, there is a direct relationship between the amount of anodically-generated carbon dioxide and the oxygen required to complete the cathodic reaction. Further, the amount of air forced over the cathode (which is driven by the anodically-generated $CO_2$) depends upon the amount of $CO_2$ that is generated. It follows then that as more $CO_2$ is generated, more oxygen will be forced over the cathode. Accordingly, the oxygen management can occur passively in this embodiment of the invention.

In order to maintain greater control over the air flow while still having a passive system, in another embodiment of the invention the $CO_2$ is collected in a chamber before passing to the vent turbine. While $CO_2$ is generated, it accumulates in the chamber until a sufficient volume is generated to provide pressure to drive the vent turbine at a desired rate. This rate can be regulated in a number of ways including measuring the gas pressure and actuating a valve to release the $CO_2$ when a sufficient amount of $CO_2$ has been generated or is at a desired value. Alternatively, a pressure release valve may be used to release the stored $CO_2$ to drive the vent turbine.

The system is also adjustable for conditions such as damp environments and/or low ambient temperatures. In such cases, it is possible that the $CO_2$ generated will not be sufficient to drive the vent turbine at a rate that will supply sufficient oxygen to maintain the desired cathodic reactions. In order to address these situations, the fuel system of the present invention includes a motor to actively drive either the vent turbine or the inlet turbine, or both. This may be needed in such damp environments where increased air-flow is needed to remove excess water from the cathode chamber. Alternatively, in warm or dry conditions, it may be necessary to limit the flow of air across the cathode to prevent the membrane electrolyte from drying out, in which case, the membrane electrolyte may not operate properly.

In accordance with another aspect of the invention, a diaphragm is incorporated into the membrane electrode assembly to provide airflow management. As noted herein, the anode chamber and the cathode chamber are separated by a membrane-diaphragm assembly. A first portion of the membrane-diaphragm assembly consists of a membrane electrode assembly. In accordance with this aspect of the invention, a second portion of the membrane consists of a gas impermeable flexible diaphragm. Additionally, the cathode chamber has an air inlet valve and an air outlet valve, each of which may be controlled using a digital controller. In an air inlet mode, the inlet valve is open and the outlet valve is closed, allowing fresh air to enter but not to exit the cathode chamber. Carbon dioxide generated at the anode is vented to the environment (or is used to drive other processes in the fuel cell system). In the air displacement mode, the inlet valve is closed while the outlet valve is open and the anodic generation of $CO_2$ increases the pressure in the anode chamber causing the diaphragm to expand thus driving air out of the cathode chamber and causing air to flow over the cathodic face of the membrane electrolyte assembly. The outlet valve is then closed and the anode valve opened and the $CO_2$ is vented. The system is thus returned to the air inlet mode. Upon return to the air inlet mode, fresh air returns to the cathode chamber to provide oxygen to facilitate the reaction. The sequence is repeated as needed. Alternatively, the MEA may be constructed of flexible gas impermeable materials that allow the MEA itself to act as a diaphragm, thus facilitating the flow of air within the cathode chamber of the fuel cell system.

BRIEF DESCRIPTION OF THE DRAWINGS

The invention description below refers to the accompanying drawings, of which.

DETAILED DESCRIPTION OF AN
ILLUSTRATIVE EMBODIMENT

The present invention is a method and apparatus for $CO_2$-driven oxygen management for a direct oxidation fuel cell system. The fuel to be used in the system may be a carbonaceous fuel including, but not limited to, methanol, ethanol, propane and butane, or an aqueous solution of any of those fuels. For purposes of illustration, we herein describe an illustrative embodiment of the invention as it is employed in connection with a direct methanol fuel cell ("DMFC"), with the fuel substance being methanol or an aqueous methanol solution. It should be understood, however, that the method and apparatus can be readily used with other types of direct oxidation fuel cells. Thus, as used herein, the word "fuel" shall include methanol, ethanol, propane, butane or combinations thereof and aqueous solutions thereof and any other carbonaceous fuels that are amenable for use in a direct oxidation fuel cell system.

Figure 1:
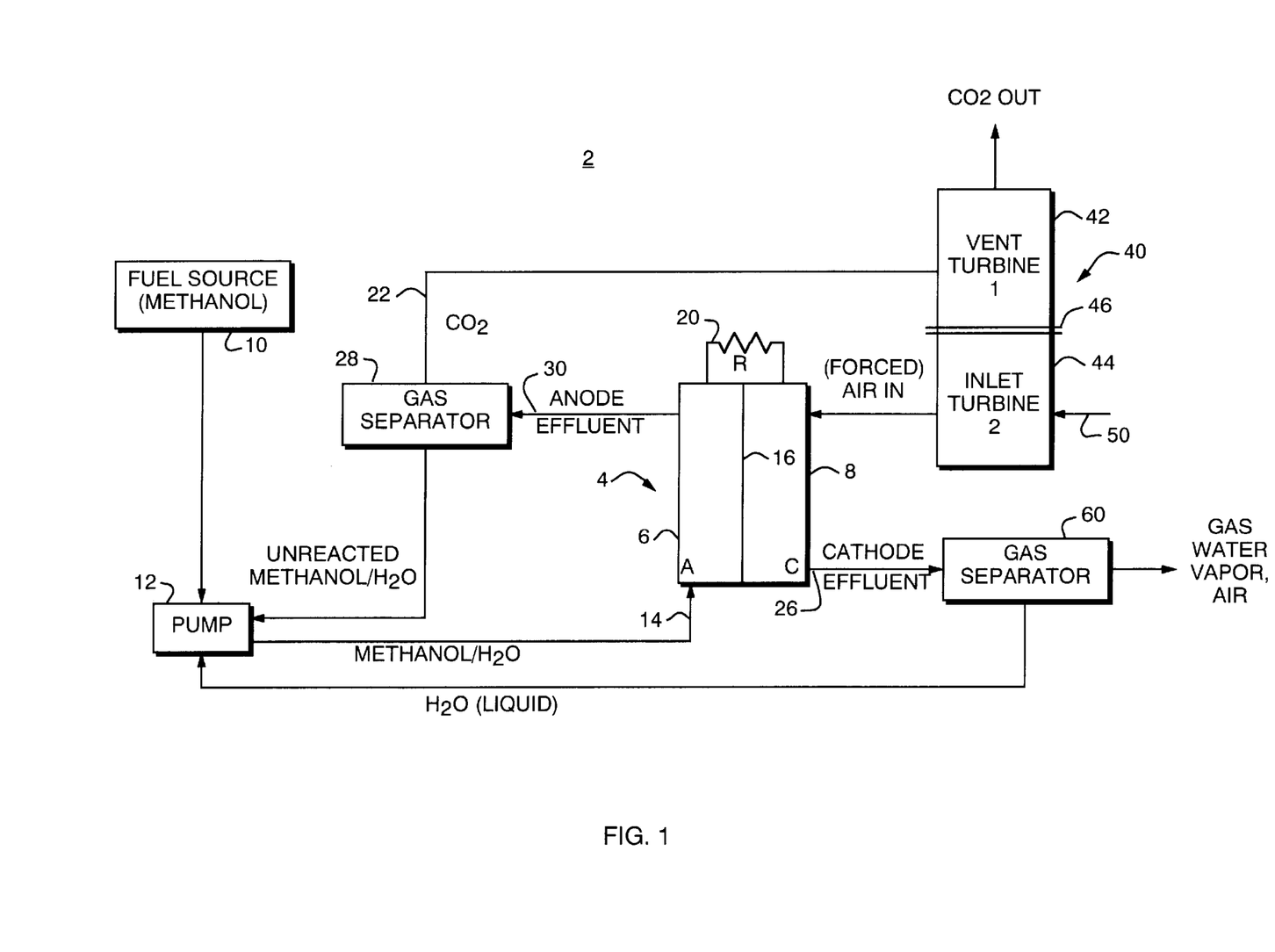
FIG. 1 is a block diagram of a direct oxidation fuel cell system depicting the turbine assembly of one embodiment of the present invention.

FIG. 1 shows a direct methanol fuel cell system 2 with which the air management apparatus of the present invention is used. For a better understanding of the present invention, the system 2 will be briefly described. The direct methanol fuel cell system 2 contains a direct methanol fuel cell (DMFC) 4. The fuel cell 4 has anode chamber 6 and cathode chamber 8. Anode chamber 6 and cathode chamber 8 are separated by a membrane electrolyte assembly, comprised of a protonically conductive (but electronically non conductive) membrane (PCM) which may be coated with catalyst, and diffusion layers (not shown) which are in intimate contact with the catalysts on each of the anode and cathode faces of the PCM. More specifically, PCM may be comprised of Nafion (a registered trademark of the DuPont company). Each side of the PCM is typically treated with a catalyst such as platinum, or a platinum/ruthenium combination, or other suitable materials. A diffusion layer is added on both sides which may consist of carbon impregnated cloth or paper. This entire assembly is the membrane electrode assembly (MEA) 16.

A fuel, such as methanol, is supplied from a fuel source 10 through a pump 12 (if desired in the particular application) to the anode chamber 6 of the cell 4, as shown by the line 14 leading into the anode chamber 6 of the fuel cell 4.

As will be understood by those skilled in the art, the carbonaceous fuel in an aqueous solution (typically an aqueous methanol solution) is presented to the anode face of the MEA 16 directly. Catalysts (not shown) on the PCM (or which are otherwise present in the anode and cathode chambers) enable direct oxidation of the carbonaceous fuel on the anode, and combination of the protons, electrons and oxygen into water on the cathode face of the MEA. Upon the closing of a circuit, the protons pass through the MEA 16 which is impermeable to the electrons. The electrons seek a different path to reunite with the protons and travel through a load 20 and thus provide the electrical power of the cell. This separates the hydrogen protons and electrons from the fuel molecules. The electrochemical reaction equations are as follows:

Anode: $CH_3OH + H_2O = CO_2 + 6H^+ + 6e^-$  Equation 1

Cathode: $4H^+ + 4e^- + O_2 = 2H_2O$  Equation 2

Net Process: $CH_3OH + 3/2 O_2 = CO_2 + 2H_2O$  Equation 3

The reaction at the anode of the direct oxidation fuel cell 4, as shown in Equation 1, produces carbon dioxide ($CO_2$). A gas separator 28 receives the anode effluent 30 and separates out any un-reacted methanol or aqueous methanol solution which may be sent to pump 12 to be reintroduced to the anode as desired in a particular application. Water is produced in the cathode chamber, as indicated in Equation 2. A second gas separator 60 receives the cathode effluent as shown schematically by line 26. The gas separator 60 separates the effluent from the cathode into liquid (i.e., water, which may be supplied to the pump 12) and vapor and air, which may be released into the environment. It should be understood that gas separators 28,60 may consist of a membrane and may be mechanically integrated or fabricated with the anode chamber 6 and cathode chamber 8 respectively.

In accordance with the first aspect of the invention, a turbine assembly 40 includes a vent turbine 42 and an inlet turbine 44. The turbine assembly 40 is in fluid communication with the anode chamber 6 of the fuel cell 4 via the gas separator 28. The anodically-generated $CO_2$ from the anode chamber 6 flows over the blades, (not shown) of the vent turbine 42. The vent turbine 42 is attached to a drive shaft 46 that is used to cause a inlet turbine (or fan) 44 to turn so that it draws oxygen (generally from ambient air) through air inlet 50 into the cathode chamber 8 of the fuel cell 4. This forces oxygen through the cathode chamber 8 and over the cathode face of the MEA 16.

Directing the oxygen over the cathode face of the MEA facilitates the reactions proceeding to completion, as discussed. This can occur passively because there is a direct relationship between the volume of the $CO_2$ generated by the anodic reactions described in Equation 1 and the oxygen necessary to complete the cathodic reactions described in Equation 2. However, the amount of air forced over the cathode by the inlet turbine 44 is also in proportion to the amount of $CO_2$ generated that drives the vent turbine 42, therefore as additional $CO_2$ is generated, the vent turbine 42 and inlet turbine 44 will rotate faster, inducing more air into the cathode to facilitate the cathodic reaction.

In addition to introducing sufficient oxygen to the cathode face of the MEA, the increased airflow assists in the evaporation of cathodically-generated water. The removal of cathodically generated water will allow the oxygen increased access to the cathode face of the MEA, further facilitating the reaction.

In certain circumstances, however, passively driving the turbine assembly may not draw a sufficient amount of air over the cathode to provide sufficient oxygen to the cathode face of the MEA, or clear cathodically-generated water from the cathode face of the MEA. As such, under certain operating conditions, which include but are not limited to high ambient humidity levels or low ambient temperature, or due to internal conditions within the DMFC, it may be advantageous to actively manage the flow of air across the cathode, in order to provide sufficient oxygen to the MEA or to facilitate evaporation of the cathodically generated water from the MEA. Depending upon the configuration of the DMFC, including required form factors, the invention is adaptable to the utilization of a motor, or a gear box or other apparatus to assist in or otherwise control the direction or rate of rotation of the drive shaft 46 and the inlet turbine 44. This may also include a clutch or other mechanical device to limit rotation of either the vent turbine 42 or the inlet turbine 44, as will be understood by those skilled in the art.

Figure 2:
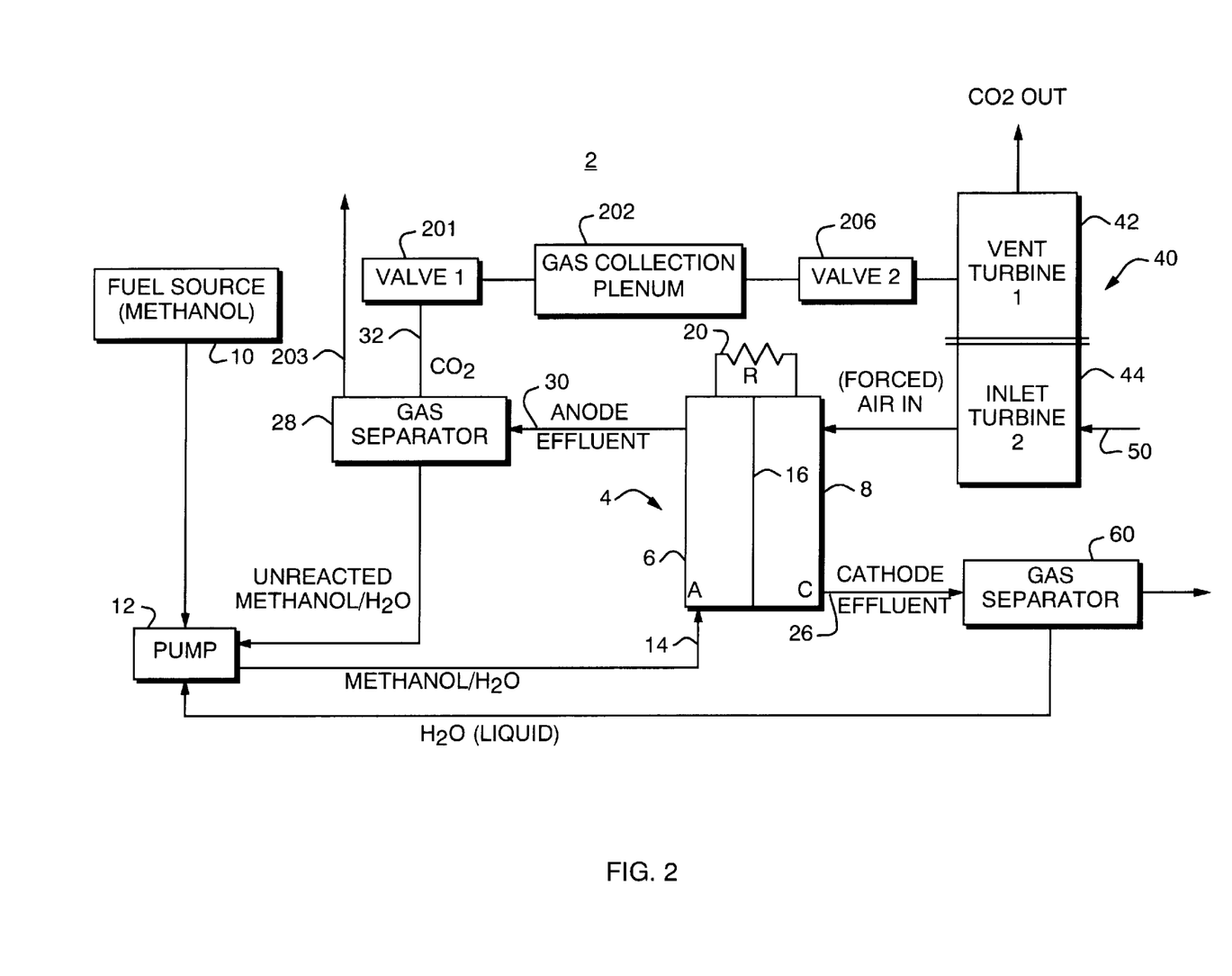
FIG. 2 is a block diagram of a direct oxidation fuel cell system showing the gas collection chamber and valve assemblies of the present invention.

FIG. 2, in which like elements have like reference numerals as those shown in FIG. 1, illustrates another embodiment of the invention. The anodically-generated $CO_2$ passes from the gas separator 28, through valve 201, to be collected in a gas collection chamber 202. As $CO_2$ is generated in the anode chamber 6 of the fuel cell 4, it is released as the anode affluent 30, passes through gas separator 28. The valve 201 is used to regulate the flow of $CO_2$ into the gas collection chamber 202. The gas is accumulated in the gas collection chamber 202 until a predetermined volume is reached that provides adequate pressure to drive the vent turbine 42 and thus the inlet turbine 44 at a desired rate. When this pressure is reached, the valve 206 is opened which allows the $CO_2$ to be released to drive the vent turbine, or to be stored in the gas collection chamber 202 by closing valves 201 and 206. The $CO_2$ may also be vented into the atmosphere to another part of the system without driving the vent turbine 42 by opening vent 203 should the $CO_2$ be collected in the gas collection chamber 202 more quickly than desired.

There are a number of ways in accordance with the invention to determine whether or not there is sufficient pressure in the gas collection chamber 202 to drive the vent turbine 42. In accordance with a first method, the gas pressure within the chamber 202 (or within the anode chamber 6 of the cell) can be measured directly with a pressure measurement device. The measured value is then compared with a predetermined optimum value. Upon reaching a predetermined pressure, valve 201 may be closed, terminating communication between the gas separator and the chamber 202. $CO_2$ may then be stored in chamber 202 until it is necessary to introduce oxygen to the cathode face of the MEA. Valve 206 may then be actuated, releasing $CO_2$ to drive the vent turbine 42, thus causing the inlet turbine 44 to draw air over the cathode surface of the MEA 16.

In accordance with another aspect of this embodiment the invention, the volume of gas generated and collected in chamber 202 can be measured indirectly in several ways due to the relationship between the generation of $CO_2$ and other operating characteristics of the DMFC. Specifically, methods that utilize these relationships include but are not limited to, measuring the amount of fuel consumed or the time elapsed since the $CO_2$ was directed from the gas separator 28 to chamber 202 or the amount of electricity that has passed through load 20, to determine the volume of $CO_2$ generated. Fuel concentration or other conditions relating to the operation of the fuel cell power system can also be measured to determine the volume of $CO_2$ generated. These measurements can be used as values in algorithms describing the system to determine the volume of $CO_2$ generated. The valve 206 is actuated to release $CO_2$ to drive the vent turbine 42 if the (indirectly) measured value exceeds a predetermined threshold value. Alternatively, if desired in a particular application, the valve 206 can be a pressure relief valve that automatically opens to release $CO_2$ to drive the vent turbine 42 when a threshold pressure is reached.

In accordance with another aspect of the method of the invention, it is possible to generate turbulence within the anode chamber 6 to create an acoustic wave to agitate the aqueous fuel solution within the anode chamber 6. This can be accomplished by the sequenced opening and closing of the $CO_2$ outlet valve 203 resulting in variations in pressure at regular intervals. One manner in which this may be accomplished is to electronically coordinate the frequency of the opening and closing of the $CO_2$ outlet valve 203. As will be understood by those skilled in the art, variations in pressure are known to cause turbulence in fluids (including gases) and to induce mixing of discrete compounds.

Figure 3:
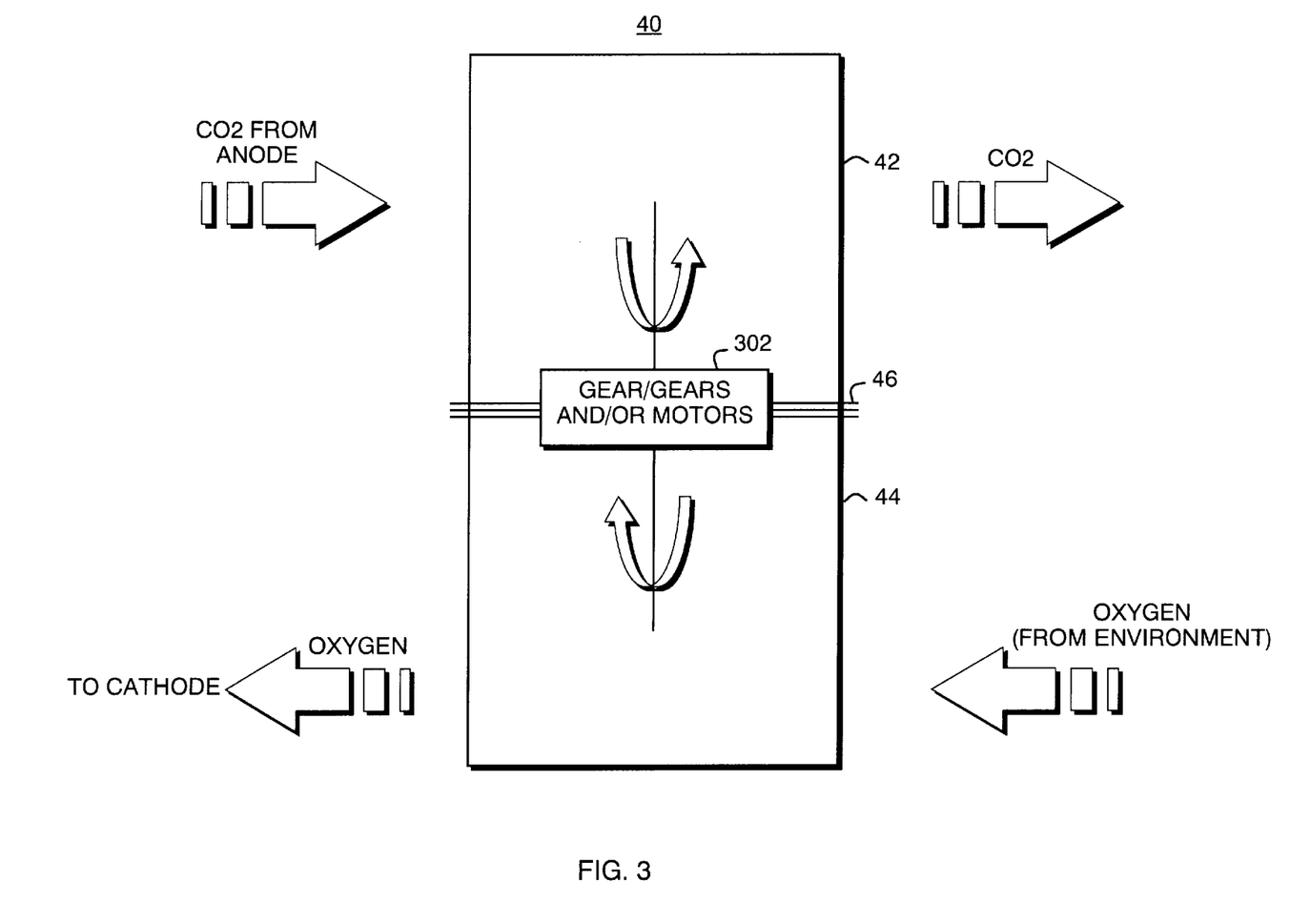
FIG. 3 is a schematic illustration of the flow of oxygen through the cathode and the flow of $CO_2$ from the anode and a gear and motor assembly that may be employed in accordance with one embodiment of the present invention.

FIG. 3 illustrates the turbine assembly 40 in greater detail. The vent turbine 42 and the inlet turbine 44 are separated by a gear and motor assembly 302 to operate the drive shaft 46. The gear and motor assembly 302 is preferably a simple motor which drives the vent turbine 42 or the inlet turbine 44 under certain conditions. The motor operation would not typically be initiated unless certain predetermined operating conditions are met, including, but not limited to, excess humidity which could cause a damp environment which reduces the ability to dry out the cathode side or a low oxygen flow level in the cathode chamber. As such the motor is not used under normal operating conditions but is used to drive the inlet turbine under certain non-typical operating conditions. The operating conditions may be monitored using sensors and measuring devices. Operating conditions, such as pressure, temperature, humidity and the like may be measured to determine whether to drive the inlet turbine to increase the flow of oxygen to the cathode chamber 8, under particular circumstances.

It should be understood that the inlet turbine need not be placed directly contiguous to the vent turbine, but may be placed in a different location that provides the proper airflow to the cathode chamber. It is possible, for example, that the inlet turbine 44 may be placed downstream of the air inlet and configured to "pull" air through the cathode chamber rather than "pushing" air through the cathode chamber. In addition, it may be desirable to configure more than one turbine as the vent turbine or the inlet turbine for example to maintain airflow as desired.

The invention is readily adaptable to a number of turbine designs depending on the application with which the direct oxidation fuel cell power system is being employed. The turbines may be selected from a number of designs known to those skilled in the art, and may be fabricated using conventional or MEMS fabrication techniques or a combination thereof.

Figure 4A:
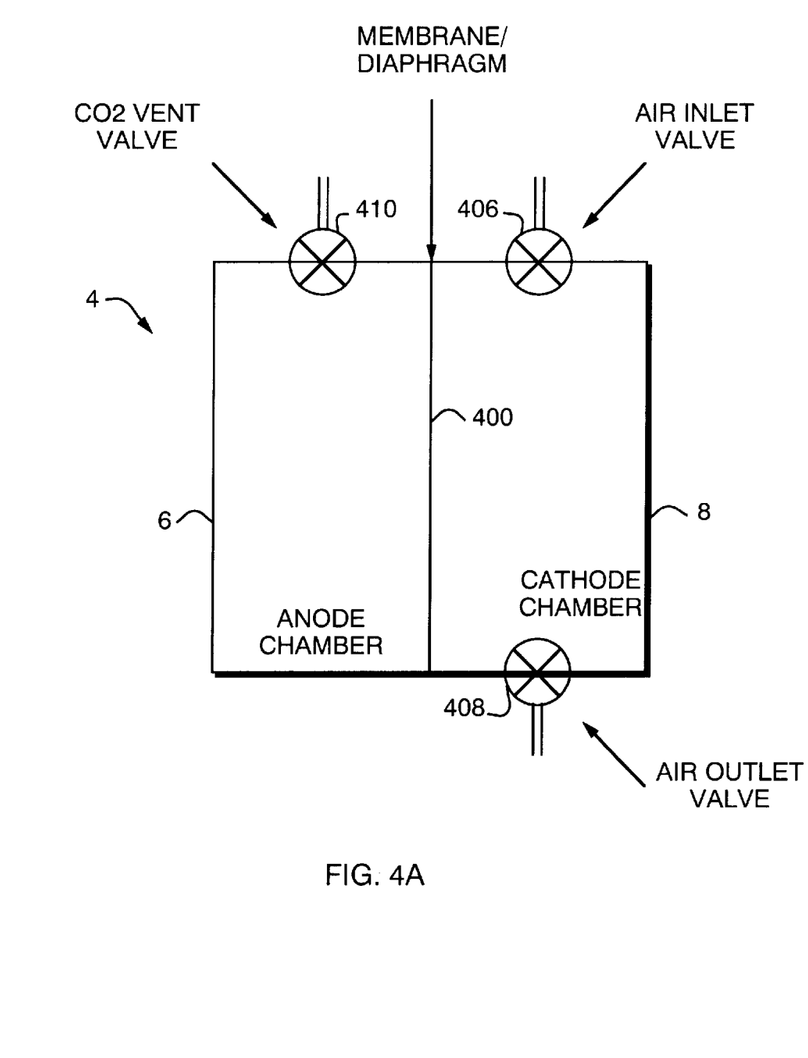
FIG. 4A is an illustration of the fuel cell of the present invention and the valving configuration in accordance with one aspect of the invention.

In accordance with yet another embodiment of the invention, FIG. 4A illustrates a separation assembly that provides further control of air passing into the fuel cell. As shown in FIG. 4A, in accordance with this aspect of the invention, the anode chamber 6 and the cathode chamber 8 of the fuel cell 4 are separated by a membrane-diaphragm separation assembly 400.

Figure 4B:
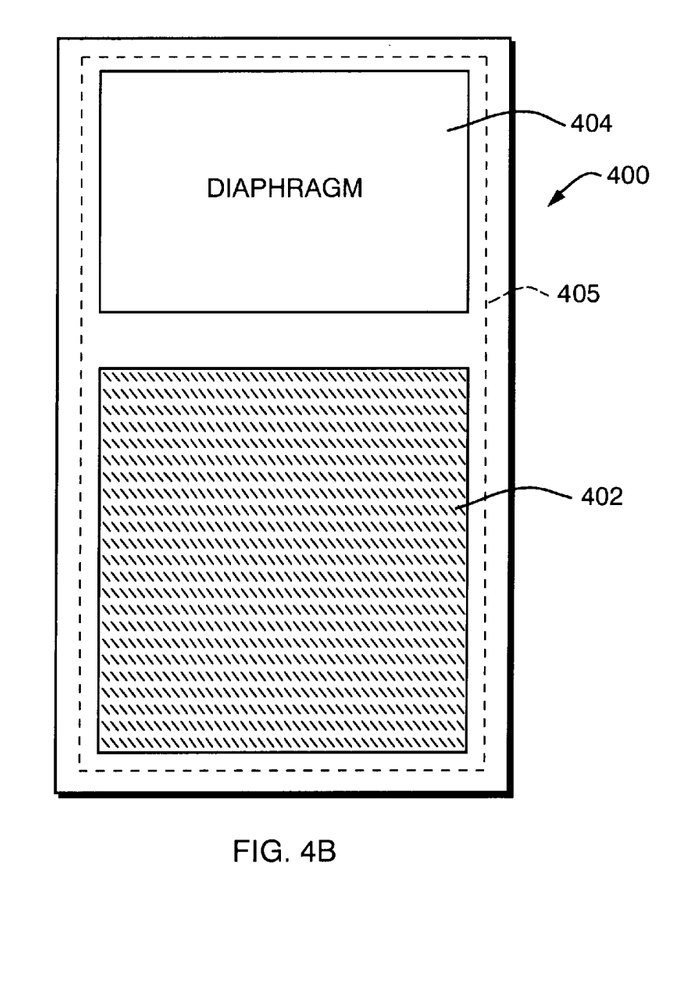
FIG. 4B is a plan view of the membrane electrolyte and a flexible diaphragm in accordance with one aspect of the present invention.

This is shown in greater detail in FIG. 4B, which illustrates a membrane-diaphragm separation assembly 400 having a membrane electrode assembly 402 composed of a PCM, catalysts and diffusion layers. The membrane-diaphragm separation assembly 400 also includes a diaphragm portion 404 which is composed of a flexible impermeable material which may be manufactured with suitable plastics having the appropriate physical characteristics.

In accordance with this embodiment of the invention, the cathode chamber 8 of the fuel cell 4, has an air inlet valve 406 and an air outlet valve 408. Each of the valves 406 and 408 may be controlled by a digital controller (not shown) which is programmed to provide an actuation signal to the respective valve when desired conditions are met. It is noted that the two sections of the membrane-diaphragm separation assembly 400 (i.e., 402, 404) may be located in separate chambers as depicted in FIG. 4B, or may be integrated within the same chamber, depending on the requirements of the particular application. This configuration is depicted as dashed box 405 in FIG. 4B. Other configurations could also be employed while remaining within the scope of the present invention.

FIG. 4A shows the DMFC in operation, in the air inlet mode, the inlet valve 406 is open. The outlet valve 408 is closed, allowing fresh air to enter the cathode chamber 8 but not exit. Carbon dioxide generated at the anode 6 is vented to the environment through the carbon dioxide vent valve 410. Alternatively, the carbon dioxide may be vented used to actuate other processes in the fuel cell power system. To encourage air movement, the invention is placed in an air displacement mode. In the air displacement mode, inlet valve 406 and carbon dioxide vent valve 410 are closed while the outlet valve 408 is opened. In this instance, the anodic generation of $CO_2$ increases the pressure within the anode chamber 6 causing the diaphragm 404 (FIG. 4B) to expand, driving air out of the cathode chamber to the air outlet valve 408 and causing air to flow over the cathodic face of the membrane electrolyte assembly 402. The air outlet valve 408 is then closed, the inlet valve 406 is reopened and the carbon dioxide vent valve 410 is opened, thus releasing the $CO_2$ and returning the system to air inlet mode. Upon return to the air inlet mode, fresh air returns to the cathode chamber 8 to provide oxygen to facilitate the reaction as discussed herein.

Figure 5A:
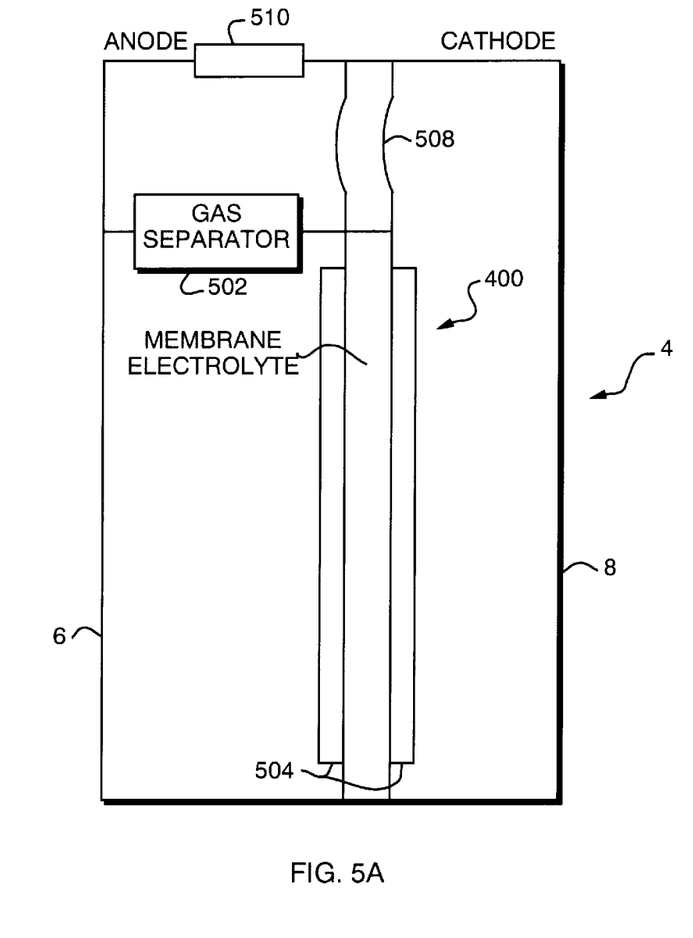
FIG. 5A is a schematic illustration of another embodiment of the invention in which the flexible diaphragm is used to control the airflow within the fuel cell.
Figure 5B:
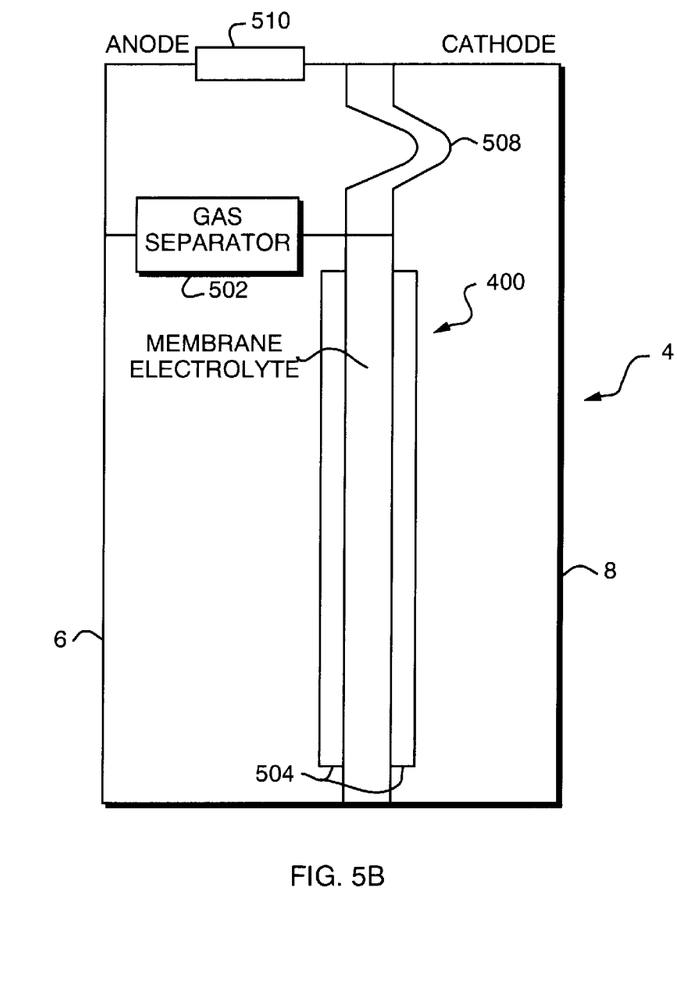
FIG. 5B illustrates the assembly of FIG. 5A with the diaphragm expanded.

FIGS. 5A and 5B illustrate the cell 4 having anode chamber 6 and cathode chamber 8, and a gas separator 502. A membrane-diaphragm separation assembly 400 is comprised of a diaphragm 508 and a membrane electrolyte assembly portion 504. The diaphragm 508 is shown in FIG. 5A is in the air inlet mode, and may be slightly bowed towards the anode chamber in the air inlet mode.

FIG. 5B shows the cell 4 in the air displacement mode. In this mode, the inlet valve is closed while the outlet valve is opened (FIG. 4A), causing the diaphragm 508 to expand as shown in FIG. 5B, thus driving air out of the cathode chamber and causing air to flow over the cathodic face of the membrane electrolyte. The outlet valve 408 is then closed and the inlet valve 406 is opened to return the system to the air inlet mode. This sequence is repeated and may be regulated by the use of pressure relief valve 510, or electronically activated valves. As noted, the diaphragm may be placed in other orientations while remaining within the scope of the present invention.

Alternatively, the membrane electrode assembly 402 may be fabricated using flexible, impermeable materials that allow the MEA itself to act as a flexible diaphragm to regulate the flow of air into an out of the chambers 6 and 8, in a manner similar to the diaphragm 508. In doing so, the need for a separate diaphragm is eliminated, allowing greater MEA area and reaction.

It should be understood that the present invention provides a method and apparatus to facilitate the flow of ambient air (oxygen) across the cathode face of direct oxidation fuel cell by using the anodically-generated $CO_2$ already available as a by-product of the reactions in the fuel cells. This allows for increased efficiency of the power generating reaction while recycling the $CO_2$ which is generated in the reaction. A number of embodiments of the invention have been described and the embodiment best suited to a particular application can be selected for adaptation in that application.

The foregoing description has been directed to specific embodiments of the invention. It will be apparent, however, that other variations and other modifications may be made to the described embodiments, with the attainment of some or all of the advantages of such, therefore, it is the object of the appended claims to cover all such variations and modifications as come within the true spirit and scope of the invention.

What is claimed:

1. A direct oxidation fuel cell system comprising:
   (A) a direct oxidation fuel cell including an anode, a cathode, and a protonically conductive, electronically non-conductive membrane electrolyte disposed between the anode and the cathode;
   (B) a source of oxygen coupled to said cathode so as to produce electricity-generating reactions including anodic disassociation of a fuel and water mixture to produce carbon dioxide, protons and electrons and a cathodic combination of protons, electrons and oxygen producing water;
   (C) a source of fuel;
   (D) a gas separator coupled to receive said carbon dioxide produced at said anode; and
   (E) a turbine assembly coupled between said gas separator and said cathode in such a manner that carbon dioxide causes operation of said turbine assembly to in turn draw air across said cathode.

2. The direct oxidation fuel cell system, as defined in claim 1, wherein said turbine assembly further comprises:
   a first turbine connected to be driven by said carbon dioxide from said gas separator;
   a drive shaft operable by said first turbine;
   a second turbine coupled with said drive shaft, and said second turbine having an ambient air inlet such that operation of said second turbine draws air into said second turbine and delivers air to said cathode of said fuel cell to provide oxygen in the form of ambient air to said cathode.

3. The direct oxidation fuel cell system as defined in claim 2, further comprising a gear box assembly coupled to said drive shaft to control rotation of said second turbine.

4. The direct oxidation fuel cell assembly as defined in claim 3, further comprising a clutch device coupled to said drive shaft to control turning of said second turbine.

5. The direct oxidation fuel cell system as defined in claim 2, further comprising a clutch device coupled to control the turning of said first turbine.

6. The direct oxidation fuel cell system as defined in claim 1, further comprising a gas collection chamber coupled to said gas separator to receive said carbon dioxide, and said gas collection chamber including a valve mechanism for releasing said carbon dioxide to said turbine assembly.

7. The direct oxidation fuel cell system as defined in claim 6, wherein said valve mechanism includes a pressure relief valve.

8. The direct oxidation fuel cell system as defined in claim 6, wherein said gas collection chamber further comprises:
   a pressure measurement device coupled to said gas collection chamber for measuring the pressure in said gas collection chamber; and
   said valve mechanism includes an opening device for releasing said carbon dioxide to said turbine assembly when said measured pressure is above a predetermined threshold value.

9. A direct oxidation fuel cell system comprising:
   (A) a direct oxidation fuel cell including an anode, a cathode, and a separation assembly including a membrane electrolyte disposed between the anode and the cathode;
   (B) a source of oxygen coupled to said cathode so as to produce electricity-generating reactions including anodic disassociation of a fuel and water mixture to produce carbon dioxide, protons and electrons and a cathodic combination of protons, electrons and oxygen producing water;
   (C) a source of fuel;
   (D) a gas separator coupled to receive said carbon dioxide produced at said anode;
   (E) a flexible diaphragm disposed in said fuel cell; and
   (F) air inlet valve and an air outlet valve disposed within said fuel cell in such a manner that when said air inlet valve is opened, fresh air enters said fuel cell, and when air inlet valve is closed and said air outlet valve is opened, said carbon dioxide produced in said anode builds up to expand said diaphragm whereby air is driven out of said cell and over said cathode to increase oxygen flowing over said cathode.

10. The direct oxidation fuel cell system as defined in claim 9 wherein said flexible diaphragm is disposed within said separation assembly adjacent to said membrane electrolyte.

11. The direct oxidation fuel cell system as defined in claim 9 wherein said membrane electrolyte incorporates said flexible diaphragm and flexes when said carbon dioxide builds up to expand said flexible diaphragm incorporated into said membrane.

12. A method of facilitating the flow of oxygen over the cathode of a direct oxidation fuel cell in a direct oxidation fuel cell system that includes an anode, a cathode and a membrane electrolyte disposed between the anode and the cathode, and a source of oxygen coupled to said cathode so as to produce electricity-generating reactions including anodic disassociation of a fuel and water mixture to produce carbon dioxide, protons and electrons and a cathodic combination of protons, electrons and oxygen producing water, a source of fuel, and a source of water, the method including the steps of:
   (A) collecting carbon dioxide gas from the anode of said fuel cell;
   (B) directing said carbon dioxide gas to drive an associated turbine assembly; and
   (C) coupling said source of oxygen to said turbine assembly whereby said carbon dioxide drives said turbine assembly and oxygen is delivered to said cathode of said direct oxidation fuel cell.

13. The method as defined in claim 12 including the further step of:
   maintaining said collected carbon dioxide in a collection chamber;
   measuring the pressure of said carbon dioxide in said collection chamber;
   comparing said measured pressure to a predetermined threshold pressure; and
   releasing said carbon dioxide to said turbine assembly when said measured pressure is above said threshold pressure.

14. The method as defined in claim 12 wherein said direct oxidation fuel cell is a direct methanol fuel cell.

15. The method as defined in claim 12, including the further step of
regulating the flow of air into said fuel cell using a flexible diaphragm.

16. The method as defined in claim 12 including the further step of
agitating the aqueous fuel solution in the anode chamber to generate turbulence and to produce an acoustic wave to induce mixing of substances in said fuel cell.

17. The method as defined in claim 16 wherein said agitation step includes the further steps of;
providing a valving assembly associated with said anode: and
sequencing opening and closing of said valving assembly to produce turbulence in said fuel solution.

18. A direct oxidation fuel cell system including a direct oxidation fuel cell having an anode, a cathode, and protonically conductive, electronically non-conductive membrane electrolyte disposed between the anode and the cathode, a source of oxygen coupled to the cathode so as to produce electricity-generating reactions including anodic disassociation of a fuel and water mixture to produce carbon dioxide, protons and electrons and a cathodic combination of protons, electrons, and oxygen, producing water, a source of fuel, a gas separator coupled to receive the carbon dioxide produced at the anode, the system comprising:
a turbine assembly coupled between the gas separator and the cathode in such a manner that carbon dioxide causes operation of said turbine assembly to draw air across the cathode.

19. The direct oxidation fuel cell system as defined in claim 18 wherein said turbine assembly further comprises:
a first turbine connected in such a manner as to be driven by said carbon dioxide from said gas separator;
a drive shaft operable by said first turbine;
a second turbine coupled with said drive shaft, and said second turbine having an ambient air inlet such that operation of said second turbine draws air into said second turbine and delivers air to said cathode of said fuel cell to provide oxygen in the form of ambient air to said cathode.

20. The direct oxidation fuel cell systems as defined in claim 19, further comprising a gear box assembly coupled to said drive shaft to control rotation of the second turbine whereby air is drawn into said fuel cell to provide oxygen in the form of ambient air to said cathode.

21. The direct oxidation fuel cell system as defined in claim 20, further comprising a clutch device coupled to said drive shaft to control turning of said second turbine.

22. The direct oxidation fuel cell system as defined in claim 18, further comprising
a gas collection chamber coupled to said gas separator to receive said carbon dioxide, and said gas collection chamber including a valve mechanism for releasing carbon dioxide without substantially drawing air into said turbine assembly.

23. A membrane electrolyte assembly for a direct oxidation fuel cell system comprising:
(A) a generally planar, protonically-conductive, electronically non-conductive membrane electrolyte wherein one side of said membrane electrolyte acts as a cathode and a second side of said membrane electrolyte acts as an anode so as to produce electricity-generating reactions when exposed to a source of oxygen and a source of fuel, said electricity generating reactions including anodic disassociation of a fuel and water mixture to produce carbon dioxide, protons and electrons and a cathodic combination of protons, electrons and oxygen producing water;
(B) a catalytic coating disposed generally on at least one side of said membrane electrolyte;
(C) a diffusion layer placed contiguous to at least one side of said membrane electrolyte in such a manner to substantially disperse fuel from an associated fuel source over said membrane electrolyte;
(D) means for imparting elasticity disposed on at least one of said membrane electrolyte and said diffusion layer, wherein the membrane electrolyte assembly is capable of deforming as a flexible diaphragm.

24. The membrane electrolyte assembly as defined in claim 23 wherein said membrane electrolyte that acts as said flexible diaphragm is disposed within a direct oxidation fuel cell.

25. The membrane electrolyte assembly as defined in claim 24 wherein said direct oxidation fuel cell is disposed in a direct oxidation fuel cell system including a source of oxygen coupled to said cathode of said direct oxidation fuel cell and said source of fuel is coupled to said anode, further comprising;
(A) a gas separator coupled to receive carbon dioxide produced at said anode; and
(B) an air inlet valve and an air outlet valve disposed within said fuel cell in such a manner that when said inlet valve is open, fresh air enters said fuel cell and when said air inlet valve is closed, and said air outlet valve is open, carbon dioxide produced in said anode builds up to expand said diaphragm whereby air is driven out of said cell and generally towards said cathode to increase oxygen flowing said cathode.

26. The method as defined in claim 17 including the further step of:
providing as said valving assembly an air inlet valve and air outlet valve disposed within said fuel cell; and
opening said air inlet valve to allow fresh air to enter said fuel cell, and subsequently closing said air inlet valve and opening said air outlet valve to allow carbon dioxide to build up within said fuel cell.

27. A method of driving oxygen in a direct oxidation fuel cell system comprising:
(A) providing a direct oxidation fuel cell including an anode, a cathode, and a separation assembly including a membrane electrolyte disposed between the anode and the cathode;
(B) providing a source of oxygen and fuel in close proximity to said cathode to produce electricity generating reactions including anodic disassociation of a fuel and water mixture to produce carbon dioxide, protons and electrons and a cathodic combination of protons, electrons and oxygen, producing water;
(C) a gas separator coupled to receive said carbon dioxide produced at set anode;
(D) a gas collection chamber connected to collect carbon dioxide gas from said gas separator;
(E) a valve disposed between said gas separator and said gas collection chamber; and
(F) a turbine assembly coupled between said gas separator and said cathode in such a manner that carbon dioxide causes operation of said turbine to draw air in and across said cathode.

28. The method as defined in claim 27, including the further step of:
   pulsing said valve disposed between said gas separator and said gas collection chamber in such a matter that the $CO_2$ in said anode is mixed with said fuel to agitate a resulting mixture to induce further completion of said electricity-producing reactions.

29. A direct oxidation fuel cell system comprising:
   (A) a direct oxidation fuel cell means including an anode, a cathode, and a protonically conductive, electronically non-conductive membrane electrolyte disposed between the anode and the cathode;
   (B) means for providing oxygen coupled to said cathode so as to produce electricity-generating reactions including anodic disassociation of a fuel and water mixture to produce carbon dioxide, protons and electrons and a cathodic combination of protons, electrons and oxygen producing water;
   (C) means for providing fuel to said fuel cell;
   (D) means for separating said carbon dioxide produced at said anode; and
   (E) a turbine assembly means coupled between said means for separating out said carbon dioxide so that carbon dioxide causes operation of said turbine assembly to draw air across said cathode.

30. The direct oxidation fuel cell system, as defined in claim 29, wherein said turbine assembly means further comprises:
   first turbine means connected to be driven by said carbon dioxide;
   drive shaft means operable by said first turbine means;
   second turbine means coupled with said drive shaft means, and said second turbine means having an ambient air inlet such that operation of said second turbine means draws air into said second turbine means and delivers air to said cathode of said fuel cell means to provide oxygen in the form of ambient air to said cathode.

31. The direct oxidation fuel cell system as defined in claim 29, further comprising:
   means for agitating said carbon dioxide in said anode to enhance completion of said electricity generating reactions.

32. The direct oxidation fuel cell system of claim 31, wherein said
   means for agitating includes gas collection means coupled to said carbon dioxide separating means, and said gas collection means including valve means for releasing carbon dioxide to said turbine assembly, and for agitating said carbon dioxide.

* * * * *